(12) United States Patent
Levy et al.

(10) Patent No.: US 9,641,387 B1
(45) Date of Patent: May 2, 2017

(54) SYSTEM, METHOD, AND COMPUTER PROGRAM FOR INCREASING REVENUE ASSOCIATED WITH A PORTION OF A NETWORK

(71) Applicant: Amdocs Software Systems Limited, Dublin (IE)

(72) Inventors: Meir Levy, Givat-Chen (IL); Yaron Kadmon, Kfar Saba (IL); Ronen Kenig, Hod Hasharon (IL); Dori Ben-Moshe, Ramat Hasharon (IL); Nadav Kremer, Hadera (IL); Baruch Pinto, Kadima (IL)

(73) Assignees: Amdocs Software Systems Limited, Dublin (IE); Amdocs Development Software, Limassol (CY)

( * ) Notice: Subject to any disclaimer, the term of this patent is extended or adjusted under 35 U.S.C. 154(b) by 141 days.

(21) Appl. No.: 14/604,575

(22) Filed: Jan. 23, 2015

(51) Int. Cl.
*H04W 84/18* (2009.01)
*H04L 12/24* (2006.01)
*H04W 28/02* (2009.01)

(52) U.S. Cl.
CPC ........ *H04L 41/0813* (2013.01); *H04L 41/082* (2013.01); *H04L 41/0823* (2013.01); *H04L 41/5054* (2013.01); *H04W 28/0215* (2013.01)

(58) Field of Classification Search
CPC ........ H04W 84/18; H04L 41/12; H04L 45/02; H04L 45/00; H04L 45/04; H04L 41/04
See application file for complete search history.

(56) References Cited

U.S. PATENT DOCUMENTS

| | | | | |
|---|---|---|---|---|
| 5,255,182 A * | 10/1993 | Adams | ................. | G06Q 20/105 379/379 |
| 6,249,768 B1 * | 6/2001 | Tulskie, Jr. | ............ | G06Q 10/06 700/266 |
| 7,103,003 B2 * | 9/2006 | Brueckheimer | ...... | H04L 41/145 370/252 |
| 8,010,938 B2 * | 8/2011 | Elaasar | ..................... | G06F 8/10 717/104 |
| 8,356,431 B2 * | 1/2013 | Pratt, Jr. | ............... | H04W 84/18 37/337 |
| 8,594,625 B2 * | 11/2013 | Plymoth | ................. | H04L 12/14 379/140 |
| 2002/0087370 A1 * | 7/2002 | Brueckheimer | ...... | H04L 41/145 370/252 |
| 2008/0089335 A1 * | 4/2008 | Li | .......................... | H04L 12/18 370/392 |
| 2009/0125429 A1 * | 5/2009 | Takayama | .............. | G06Q 20/04 705/35 |

(Continued)

*Primary Examiner* — Hassan Phillips
*Assistant Examiner* — Prenell Jones
(74) *Attorney, Agent, or Firm* — Zilka-Kotab, PC

(57) ABSTRACT

A system, method, and computer program product are provided for increasing revenue associated with a portion of a network. In use, a portion of a network associated with a communication service provider (CSP) is identified, the portion of the network corresponding to at least one customer group. Additionally, one or more network characteristics associated with the portion of the network to modify are identified for increasing revenue associated with the portion of the network. Further, the one or more network characteristics associated with the portion of the network are modified to increase revenue associated with the portion of the network.

5 Claims, 7 Drawing Sheets

(56) References Cited

U.S. PATENT DOCUMENTS

| | | | |
|---|---|---|---|
| 2009/0252134 A1* | 10/2009 | Schlicht | H04L 1/0015 370/338 |
| 2009/0270069 A1* | 10/2009 | Plymoth | H04L 12/14 455/407 |
| 2010/0130177 A1* | 5/2010 | Ku | H04M 15/00 455/414.1 |
| 2010/0303232 A1* | 12/2010 | Connolly | H04M 3/42229 380/247 |
| 2012/0106428 A1* | 5/2012 | Schlicht | H04L 1/0015 370/312 |
| 2013/0232258 A1* | 9/2013 | Bullock | H04L 43/045 709/224 |
| 2015/0341854 A1* | 11/2015 | Smith | H04W 48/17 455/450 |
| 2016/0028665 A1* | 1/2016 | Yan | H04L 67/141 370/329 |

* cited by examiner

US 9,641,387 B1

SYSTEM, METHOD, AND COMPUTER PROGRAM FOR INCREASING REVENUE ASSOCIATED WITH A PORTION OF A NETWORK

FIELD OF THE INVENTION

The present invention relates to networks, and more particularly to increasing revenue associated with portions of such networks.

BACKGROUND

In the context of cellular networks, the ability to determine a geographic location of devices of such networks is achievable. Currently, the geographic location of the devices is not used in the context of business data, such as revenue, data plan information, billing information, roaming information, and customer lifetime value, etc., to generate business value for service providers associated with such networks.

For example, currently, business data analysis is performed in a billing system, which is a different system than a system performing network analytics/optimization. By correlating business data with network data, portions of networks may be evaluated and modified based on both network characteristics and the customer base.

There is thus a need for addressing these and/or other issues associated with the prior art.

SUMMARY

A system, method, and computer program product are provided for increasing revenue associated with a portion of a network. In use, a portion of a network associated with a communication service provider (CSP) is identified, the portion of the network corresponding to at least one customer group. Additionally, one or more network characteristics associated with the portion of the network to modify are identified for increasing revenue associated with the portion of the network. Further, the one or more network characteristics associated with the portion of the network are modified to increase revenue associated with the portion of the network.

DETAILED DESCRIPTION

Figure 1:
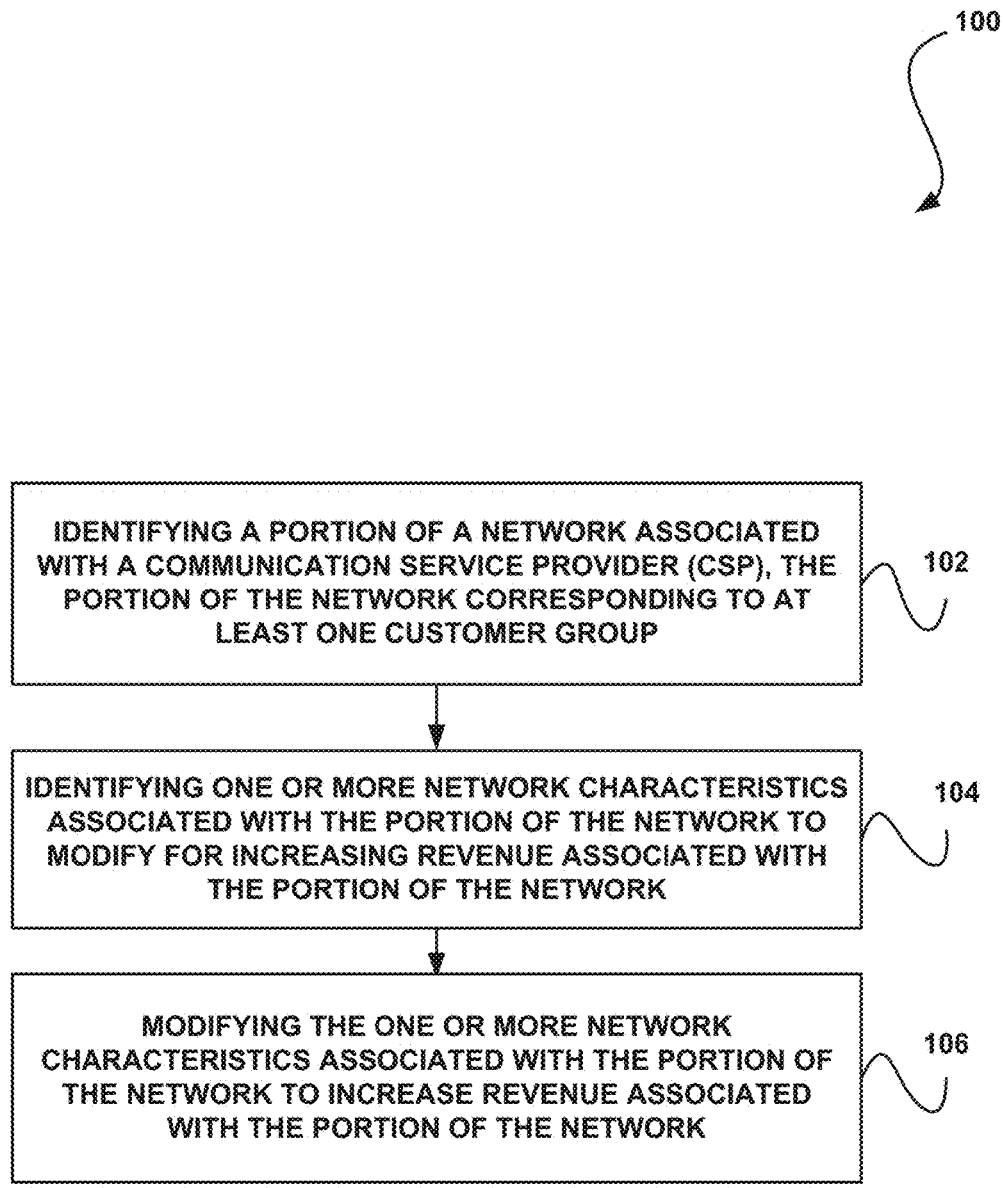
FIG. 1 illustrates a method for increasing revenue associated with a portion of a network, in accordance with one embodiment.

FIG. 1 illustrates a method 100 for increasing revenue associated with a portion of a network, in accordance with one embodiment.

As shown, a portion of a network associated with a communication service provider (CSP) is identified. See operation 102. The portion of the network corresponds to at least one customer group.

The network may include any network associated with a CSP. For example, the network may include a radio access network or a broadband network, etc. Moreover, the portion of the network may include any area of the network.

For example, in one embodiment, identifying the portion of the network may include creating one or more meshes based on a customer segmentation presence, where each of the meshes represent a geographical area associated with the network. Additionally, the meshes may each represent a yield area associated with the network.

For example, a customer foot-print mesh analysis may be performed based on a BSS customer segmentation. In this case, a class of yield areas (a group of meshes) may be created based on a customer segmentation presence.

The meshes may be created/selected based on a variety of business and network data. For example, Radio Resource Control (RRC) information and information associated with a plurality of customers corresponding to the network may be utilized to create the mesh. In one embodiment, a combination of OSI layer 3 and OSI layer 7 data may be used to create the mesh. Of course, various data may be used to create the mesh and/or identify the portion of the network.

The customer group/segmentation may include any customers grouped based on a variety of criteria. For example, such criteria may include business data. The business data may include any type of data associated with a subscriber and/or network usage, etc. For example, in various embodiments, the business data may include billing data, data plan data, pricing information data, status data, roaming data, application data, service usage data, and/or any combination thereof, etc. In one embodiment, the business data may include subscriber lifetime value data.

As shown further in FIG. 1, one or more network characteristics associated with the portion of the network to modify are identified for increasing revenue associated with the portion of the network. See operation 104. The network characteristics may include any characteristics associated with the network. For example, the network characteristics may include characteristics associated with a quality of experience (QoE) of the at least one customer group and/or a bandwidth.

Further, the one or more network characteristics associated with the portion of the network are modified to increase revenue associated with the portion of the network. See operation 106. For example, a bandwidth associated with the portion of the network may be increased. As another example, various quality of experience factors may be modified to increase satisfaction of the customer group.

In one embodiment, the method 100 may further include collecting network data to determine whether modifying the network characteristics associated with the portion of the network increased revenue associated with the portion of the network.

Further in one embodiment, the method 100 may be implemented to create a class of yield areas (i.e. a group of meshes) based on customer segmentation presence, calculate high performing yield areas within each class as a function of bandwidth and quality of experience, and enhance quality of experience and bandwidth in low performing yield areas in the appropriate yield class. The yield class may be calculated utilizing various business information, network information, and performance indicators associated with subscribers. More information regarding correlating business information with network information is described in the context of FIG. 2.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
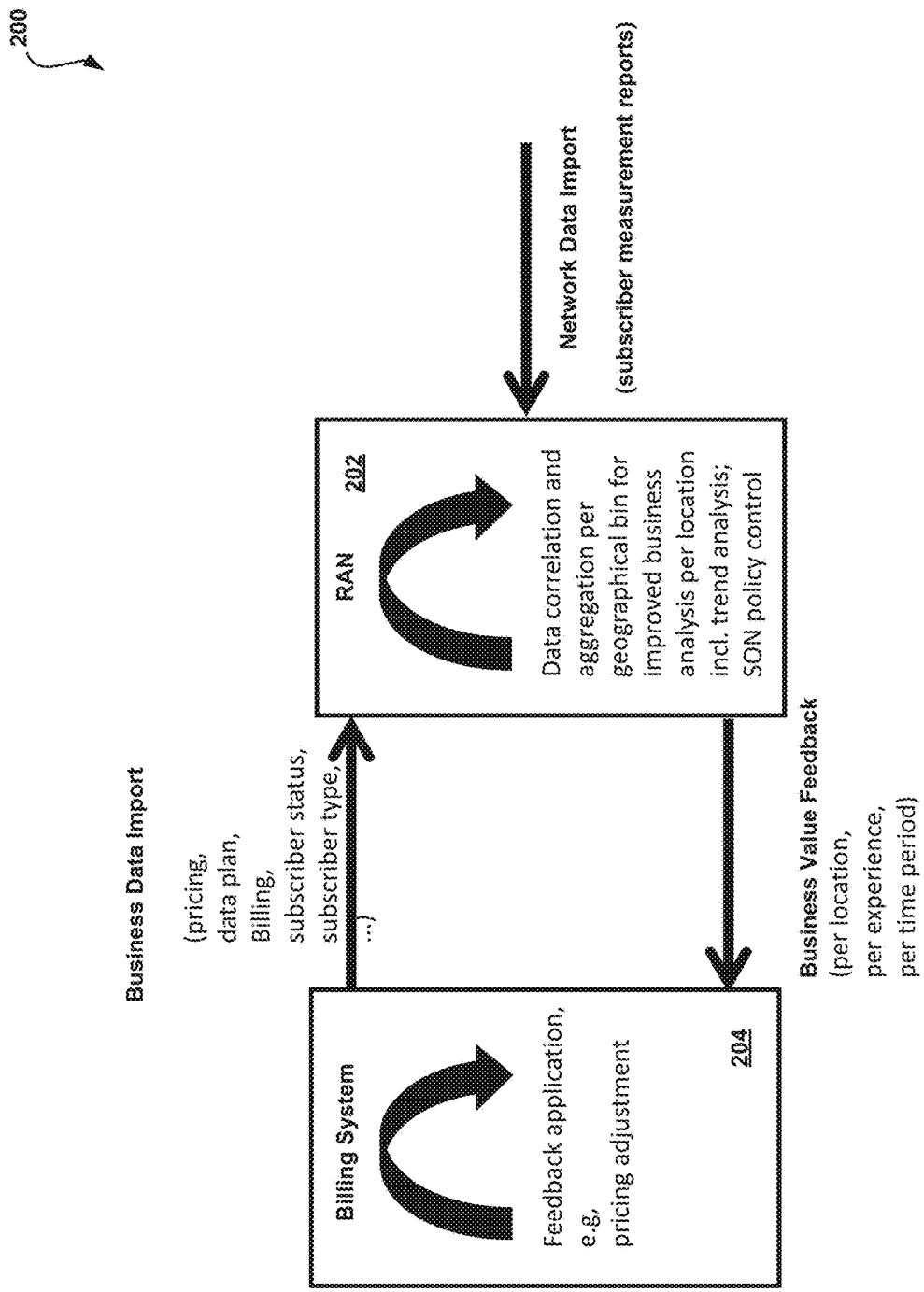
FIG. 2 illustrates a system flow for correlating business data of subscribers with a geographic positions and/or various network data, in accordance with one embodiment.

FIG. 2 illustrates a system flow 200 for correlating business data of subscribers with a geographic positions and/or various network data, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

As shown in FIG. 2, components of a radio access network 202 collect subscriber measurement reports from subscribers and geo-locates the reports. In this case, the geo-location tags the measurement reports with a position estimate.

In one embodiment, the geo-located measurement reports may then be aggregated into geographical bins by adding or averaging the measurement reports having estimated positions with a configurable dimension (e.g. with a configurable dimension of 50 m×50 m, etc.). Additionally, in various embodiments, the measurement report aggregations per geographical bin may be grouped into measurement data for a certain service (e.g. circuit-switched or packet switched services, HS-services or non-HS services, etc.), for a certain group of subscribers (e.g. all subscribers with the same device, etc.), or for a single subscriber only.

Further, in one embodiment, quality of service (QoS) based measurements (e.g. a signal-to-interference-and-noise-ratio, etc.) may be mapped into a subscriber quality of experience by mapping imported relevant statistics between quality of service and quality of experience.

In another embodiment, all geographical bins in which a certain cell is the dominant cell may be combined into the serving area of this cell. In this case, cell-based performance network data may be distributed to all these geographical bins.

As shown further FIG. 2, components of the radio access network 202 collect business data from subscribers (e.g. from a billing system 204, etc.). The business data may include billing data, data plan data, pricing information data, status data, roaming data, application data, service usage data, or the like, and/or any combination thereof which might result in a subscriber lifetime value.

The business data may be correlated with the measurement report data from the same authenticated subscriber identifier, then aggregated and grouped, such as for a certain service (e.g. a circuit-switched or packet switched service, an HS-service or non-HS service, etc.), for a certain group of subscribers (e.g. all subscriber with the same device), or for a single subscriber only.

Any combination, regression, or cross-correlation per geographical bin may function to create a new combined performance indicator which can be used in various business analysis use cases, as well as network optimization use cases, including Self-Organizing Networks (SON).

In one embodiment, additional data representing social media usage (e.g. an aggregated number of Twitter messages having a position in a certain geographical bin, etc.) may be used for further combination, regression, or cross-correlation with the various other data.

Further, in one embodiment, environment (e.g. vector or raster, etc.) data may be used to aggregate geographical bins belonging to a certain area (e.g. a street, a square, a campus, a mall, Wi-Fi hotspot areas, a competition network's base station locations, etc.) and to aggregate the created new performance indicators for these special areas.

All the data collection, including both business data and radio access network measurement report data (including any combination, regression, or cross-correlation, etc.) may be performed at multiple consecutive points in time. For example, the data collection may occur every 15 minutes, every hour, and/or every day, etc., to enable pattern recognition, trend analysis (e.g. prediction of subscriber and required capacity movements, etc.), and implement proactive changes in the network to adapt recognized/predicted future behavior (e.g. by proactive SON policy control, etc.). Any newly created performance indicator may be fed back into the billing system 204 for further application/use.

Furthermore, in various embodiments, the new performance indicators may be aggregated over a time period, and/or the new performance indicators may be aggregated over any useful combination of geographic positions/bins (e.g. the serving area of a cell, etc.).

Additionally, such performance indicators (or the aggregated performance indicators) may be utilized, not necessarily in the same system, for improved/targeted/prioritized network rollout investment decisions, improved/targeted/prioritized network optimization decisions, geographic-location based pricing (e.g. network quality based pricing, user experience based pricing time period based pricing, and/or any combination, etc.), and geographic-location based SON policy control (e.g. network quality based SON policy control, user experience based SON policy control, time period based SON policy control, and/or any combination, etc.).

Further, in various embodiments, the newly created performance indicators or an aggregation of indicators per geographical bin/per combination of geographical bins may be fed back into a billing system for pricing adjustments (e.g. to adjust the price of a service of subscribers according to the geographic location, the user experience, the realized network quality, etc.), business mismatch recognition (e.g. flat/low rate billing in high quality/good experience geographical bins, etc.), and business analysis pattern recognition and trend analysis (e.g. high value subscriber geographic re-locations, which billing should follow, etc.).

Additionally, the newly created performance indicators or an aggregation of indicators may be utilized to implement business-driven and subscriber experience-driven/value-driven network expansion and optimization instead of capacity-driven expansion, and/or any type (e.g. reactive and proactive) of SON policy control.

For example, the indicators and associated information may be utilized to create a class of yield areas (a group of meshes) based on customer segmentation presence. Moreover, high performing yield areas may be calculated within each class as a function of bandwidth and quality of experience. Quality of experience and bandwidth may be enhanced in low performing yield areas in the appropriate yield class.

Figure 3:
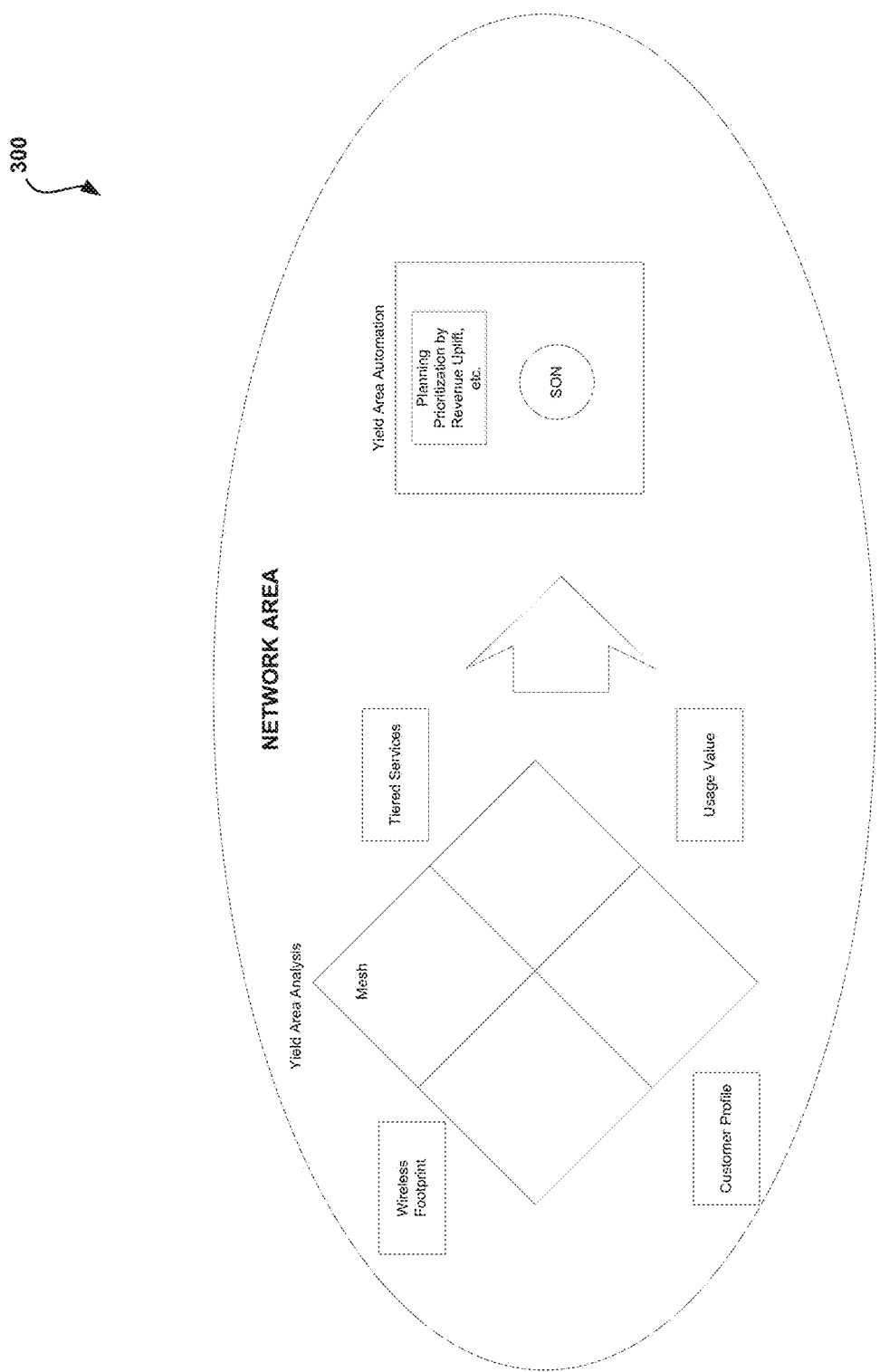
FIG. 3 illustrates a system flow for increasing revenue associated with a portion of a network, in accordance with one embodiment.

FIG. 3 illustrates a system flow 300 for increasing revenue associated with a portion of a radio access network, in accordance with one embodiment. As an option, the system flow 300 may be implemented in the context of the details of the previous Figures. Of course, however, the system flow 300 may be implemented in the context of any desired environment. Further, the aforementioned definitions may equally apply to the description below.

In operation, BSS data including customer data, product and service data, and revenue value data, etc., may be collected and added to a database. Further, a customer foot-print mesh analysis may be executed based on BSS customer segmentation. The customer segmentation may be based on any type of data.

Based on the analysis, a class of yield areas (e.g. a group of meshes) may be created based on a customer segmentation presence. The yield areas or meshes may include any area associated with the network area. In one embodiment, the mesh may include a 100×100 meter area.

Furthermore, in one embodiment, based on the analysis, one or more pie charts may be generated showing statistics associated with a yield area, such as an average bandwidth and average quality of experience per yield area (or mesh).

Further, in one embodiment, high performing yield areas within each class may be calculated as a function of bandwidth and quality of experience. Additionally, quality of experience and bandwidth may be enhanced in low performing yield areas in the appropriate yield class. Still yet, in one embodiment, a selective bandwidth and quality of experience enhancement may be performed in a specific yield area to evaluate class revenue uplift. The class revenue uplift refers to the delta in revenue between a high performing yield area and a low performing yield area.

Utilizing these techniques a system may perform network value based optimization resulting in maximized revenue per customer segment. Further, the system may perform validation and realization of revenue growth as a result of network bandwidth/QoE increase. A network may implement cell placement based on revenue uplift.

The techniques described in the context of the previous figures may be used to implement yield management in various networks and systems.

Yield management is the umbrella term for a set of strategies that enable capacity-constrained service industries to realize optimum revenue from operations. The core concept of yield management is to provide the right service to the right customer at the right time for the right price. That concept involves careful definition of service, customer, time, and price. The service can be defined according to the dimensions of the service, how and when it is delivered, and how, when, and whether it is reserved.

Timing involves both the timing of the service delivery and the timing of when the customer makes known the desire for the service, whether by reservation or by walking in to the business. Price can be set according to the timing of the service, the timing of the reservation, the type of service, or according to other rules that seem appropriate. Finally, the customer can be defined according to demand characteristics relating to the service, the timing, and the price. The ideal outcome of a revenue management strategy is to match customers' time and service characteristics to their willingness to pay-ensuring that the customer acquires the desired service at the desired time at an acceptable price, while the organization gains the maximum revenue possible given the customer and business characteristics.

The strategic levers of yield management can be summarized as calendar, clock, capacity, and cost. They are bound together by the customer. The strategic levers of yield management are geared to matching service timing and pricing to customers' willingness to pay for service in relation to its timing. Based on customers' demand levels and characteristics, management can shift the demand of those customers who are relatively price sensitive but time insensitive to off-peak times. Shifting that demand clears prime times for customers who are relatively time sensitive but price incentive.

Consumer behavior is examined to determine the correct price level to make the item enticing to the consumer. The idea is to coordinate timing, price, and consumer buying patterns to achieve the best return. The issue with yield management is that it can often result in unfair pricing for consumers. For instance, Joe may book a flight to California for $500 during the morning and Jane may book the same flight for $800 that evening. Joe was able to receive the better price because the flight still had plenty of open seats and the airline was trying harder to entice customers to purchase a ticket.

Taking yield management to the communications industry based on consumer behavior is similar to the world of retail with one goal maximizing CSP revenue from its network.

The yield management strategy for telecommunications is based on the following consumer dimensions: product and services; location; timing of service delivery; QoE; and bandwidth.

The key principle in CSP yield management is using QoE and bandwidth as the main factor, replacing price in retail yield management. It adheres to consumer behavior patterns where there is a better QoE and wider BW (bandwidth) subscribers will consume more network services and will generate more revenue for the CSP.

As the communications service providers move to tiered service models with a progressive pricing model due to diverse consumer needs, shortage of spectrum yield management will be a significant strategy to manage revenue from broadband networks wireless, fixed and cable.

Yield management is geared to increase revenue for the CSP from tiered services price points from QoE and BW bands, as spectrum and increasing investment in LTE A/B/CC will require a more advanced and progressive tool to manage BW/QoE allocations based on revenue return.

The CSP business needs that the systems and techniques described herein are aiming to address include value based network optimization and cell placement based on revenue uplift.

The business value can be realized in the measured revenue per geography. The geography acts as a unit of profit and loss (P&L).

The business value of network evolution triggered by revenue uplift managed by: network value based optimization resulting in maximized revenue per customer segment; and validation and realization of revenue growth as a result of network BW/QoE increase.

The CSP yield management is divided into two main methods: 1) yield area class analysis; and 2) yield area access proliferation.

In each method, the term "class" is referring to a group of geographical coverage area of wireless/fixed broadband areas. The basic geographical area is called a yield area. A group of yield areas compose a class. In each class there is low performing yield area (LPYA) and a high performing yield area (HPYA).

The method outcome is a calculated result bringing an LYPA to become an HPYA. The class is acting as a dynamic self-rise revenue map. The self-rising revenue map is driven by analytics decisions changing QoE and BW.

Yield areas are grouped to one class based on customer segmentations that determined by: 1) CSP BSS customer segmentation; 2) digital profile customer segmentation; and 3) interest group customer segmentation.

The class served market is dimensioned by customer segmentation and customer value. Bringing the total value of a class into a harmonized maximized value is done by minimizing the differed revenue of low performing yield areas.

The yield management methods calculate the revenue uplift within a class and this can set the network expansions automated action.

Figure 4:
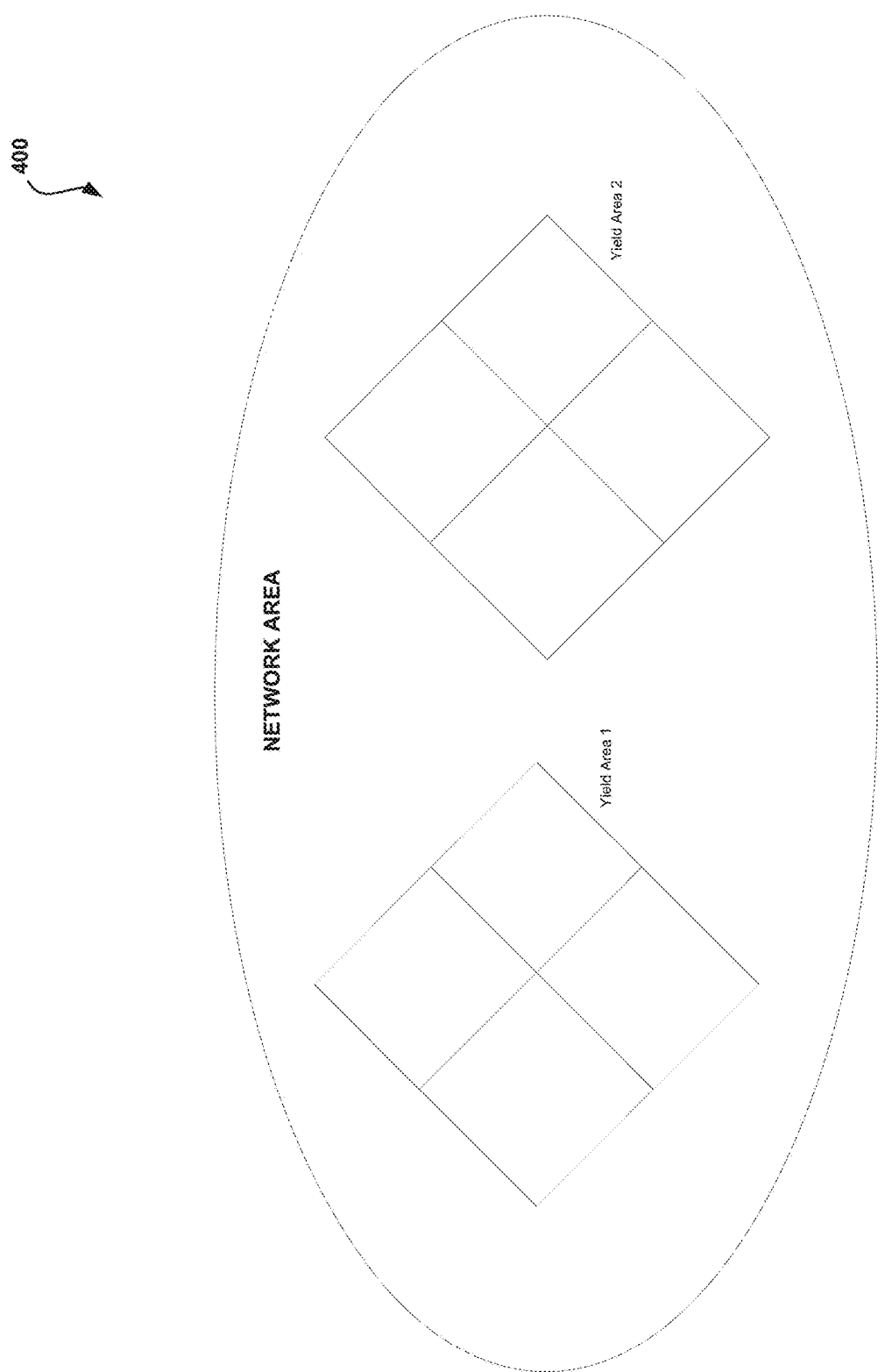
FIG. 4 illustrates a network area diagram including two yield areas, in accordance with one embodiment.

FIG. 4 illustrates a network area diagram 400 including two yield areas, in accordance with one embodiment. As an option, the diagram 400 may be viewed in the context of the details of the previous Figures. Of course, however, the diagram 400 may be viewed in the context of any desired environment. Further, the aforementioned definitions may equally apply to the description below.

The yield area is a group of meshes (e.g. 100/100 SqM meshes) grouped by customer segmentation. Yield areas similar in customer segmentation and their respective value form a class.

The yield area customer segmentation is calculated based on: wireless customer footprints; customer profile; customer usage value; and tiered services (CSP's saleable products and services).

The wireless customer footprint includes subscriber traces collected from the RNC and managed. It describes the subscriber roaming patterns. The subscriber roaming patterns depict a customer presence behavior which is used to dimension the yield area.

The geo-location dimensions may include a variety of aspects, such as tiered services (e.g. CSP's saleable IP service [i.e. video streaming GBR]), bandwidth and QoE (session speed and customer observed Quality of Experience), customer segment (market segmentation and sub-segmentation), customer digital profile (e.g. customer digital behavior and preferences), customer WLS footprints (e.g. geo-location tracking of customer usage), customer devices (e.g. smartphone, tablets, laptops, etc.), and yield area and yield area class (e.g. a group of meshes, grouped by same customer segmentation-class of yield area represents similar yield areas with same customer segmentation blend).

Customer digital profiles enhance the BSS customer profile and add a digital behavior and preference segmentations. It allows the CSP to better serve the customer session across geographies with an appropriate QoE.

The customer digital profile is directly linked to the evolving tiered services pricing model for broadband networks.

Figure 5:
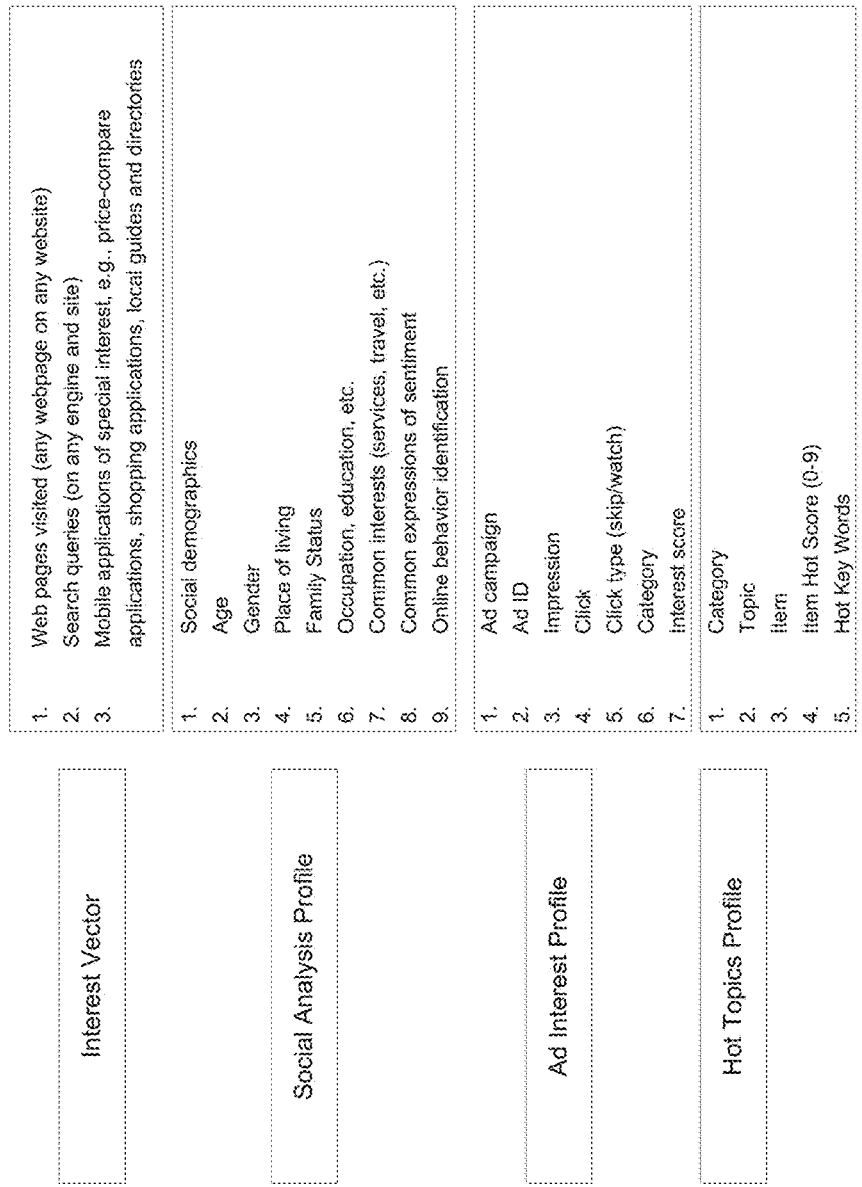
FIG. 5 illustrates a customer digital profile, in accordance with one embodiment.

FIG. 5 illustrates a customer digital profile 500, in accordance with one embodiment. As an option, the profile 500 may be viewed in the context of the details of the previous Figures. Of course, however, the profile 500 may be viewed in the context of any desired environment. Further, the aforementioned definitions may equally apply to the description below.

The analytic process of yield management utilizes various dimensions to calculate the area measurements to generate a yield insight. Such dimensions may include revenue (e.g. revenue per yield area, customer segmentation, in a selected time window [e.g. busy hour], etc.), bandwidth and QoE (e.g. average, high, low, per tiered service, per customer, etc.), low performing yield area (LPYA) (within a class of yield areas it is the lowest revenue generating yield area), high performing yield area (HPYA) (within a class of yield areas it is the highest revenue generating yield area), revenue uplift (the delta in revenue between HPYA and LPYA), cost of BW/QoE extension (e.g. the cost of BW/QoE extension in LPYA based on revenue uplift), and class selection (e.g. a class selection is a process of targeted BW/QoE extension in selected yield area in several classes to highest revenue uplift between classes).

Yield area class analysis is the method of grouping and structuring of revenue across geographies based on customer segmentation and profile (e.g. Mesh→Yield Area→Class).

The method creates an area of HPYA (High Performing Yield Area) and LPYA (Low Performing Yield Area). The array outcome in revenue is based on geography and not on physical access technology. The coverage is the mean provided by the access technology to support revenue stream from designated geography based on customer wireless footprint.

The array analysis hypothesis is based on the principle that for each served market, where there is bandwidth and better QoE subscribers will consume more services.

The potential for revenue uplift is the delta between revenue (HPYA) and revenue (LPYA). The revenue uplift size dictates the BW expansion and QoE improvement.

The yield area class analysis is a continuous process and it manages the yield area class as a dynamic system. HPYA and LPYA can be changed rapidly where an HPYA can become an LPYA as a result of network evolution. The CSP goal is to maximize revenue across classes by BW and QoE optimization.

The revenue uplift can set the type of BW and QoE investment. The following investment types can be triggered: SON CCO/ANR; adding micro cells; enhancing macro cells; and adding new macro cells.

Yield area access proliferation is a method to prioritize network access radio technology upgrade. The LTE evolution from A, B to C can be enabled by yield analysis prioritization.

The method can recommend selected classes for LTE upgrade. For each selected class, the method will recommend a set of LPYAs and HPYAs for radio technology upgrade.

The measured revenue will be performed based on inter class analysis and intra class analysis. For the inter class analysis, the method will recommend based on calculated results in which class to role first the new radio technology. The intra class analysis will recommend based on calculated results in which yield area to role first the new radio technology.

In yield area class proliferation the model is enriched with an accurate breakdown for a geography unit with a calculated revenue and revenue uplift.

The method and the process will introduce an accurate business tool to plan network expansion based on revenue gain, and to fine tune the return on the network capacity to increase investment.

Broadband yield management uses similar dimensions for street level/home drop analysis. In the world of evolving fixed technologies and new 4K/8K video broadcasting, both unicast and multicast create the need to maximize revenue from the fixed network. The broadband yield management business aim is to increase revenue from a network by targeted BW and QoE enhancements.

Broadband yield management with focus on cable networks is based on the following principles: geo-locating every home drop (mapping customer experience and demand down to the street/block level for network extension visibility); real coverage and demand (e.g. understand how the broadband network drives actual customer quality of experience); build revenue maps (e.g. link with BSS data to build accurate pictures of demographics and revenues for each location); and differentiating based on customer experience (e.g. target network investment and optimization for maximum revenue impact).

A cable network yield area is a group of home drops with similar customer segmentation. The broadband cable network dimensions are: products and services; location; timing of service delivery; QoE; and bandwidth.

The cable yield area customer segmentation for each yield area is calculated based on: broadband customer location; customer profile; customer usage value; and broadband services.

The broadband yield area class analysis utilizes cable customer segmentations to calculate revenue per yield area. The yield area for cable is defined as: Home Drop→Yield Area→Class.

The home drop is the granular unit and the cabinet or the D-CMTS is the dynamic part. The yield area grouping is performed based on customer segmentation and there could be a large difference in customer segments in the same street.

As the cable operators are moving to all IP based broadcasting with unicast and multicast services, the yield class analysis will result in BW and QoE enhancements for specific traffic types.

The yield area analysis and the BW/QoE enhancements of the low performing yield area can result in two network aspects: DOCSIS 3.x channel bonding for traffic group and D-CMTS installation. DOCSIS 3.0 onwards channel bonding provides a better BW/QoE for selected traffic types in the shared IP media.

As demand for bandwidth increase and cost of shared floors is mounting, cable operators are moving to a distributed CMTS network deployment. The broadband yield class analysis is an essential tool for cable operators to prioritize the field distribution based on revenue uplift from yield areas.

The broadband yield area access proliferation designed to help broadband operators with their move and massive investment in the FTTx journey.

As the civil engineering and other costs associated in the optic deployments soar, the method provides a class selection of yield area that potentially can bring the highest revenue uplift. For each selected class the method will recommend a set of LPYAs and HPYAs for fiber technology upgrade.

The measured revenue will be done based on inter class analysis and intra class analysis. For the inter class analysis, the method will recommend based on calculated results in which class to role first the new fiber technology. The intra class analysis will recommend based on calculated results in which yield area to role first the new fiber technology.

Figure 6:
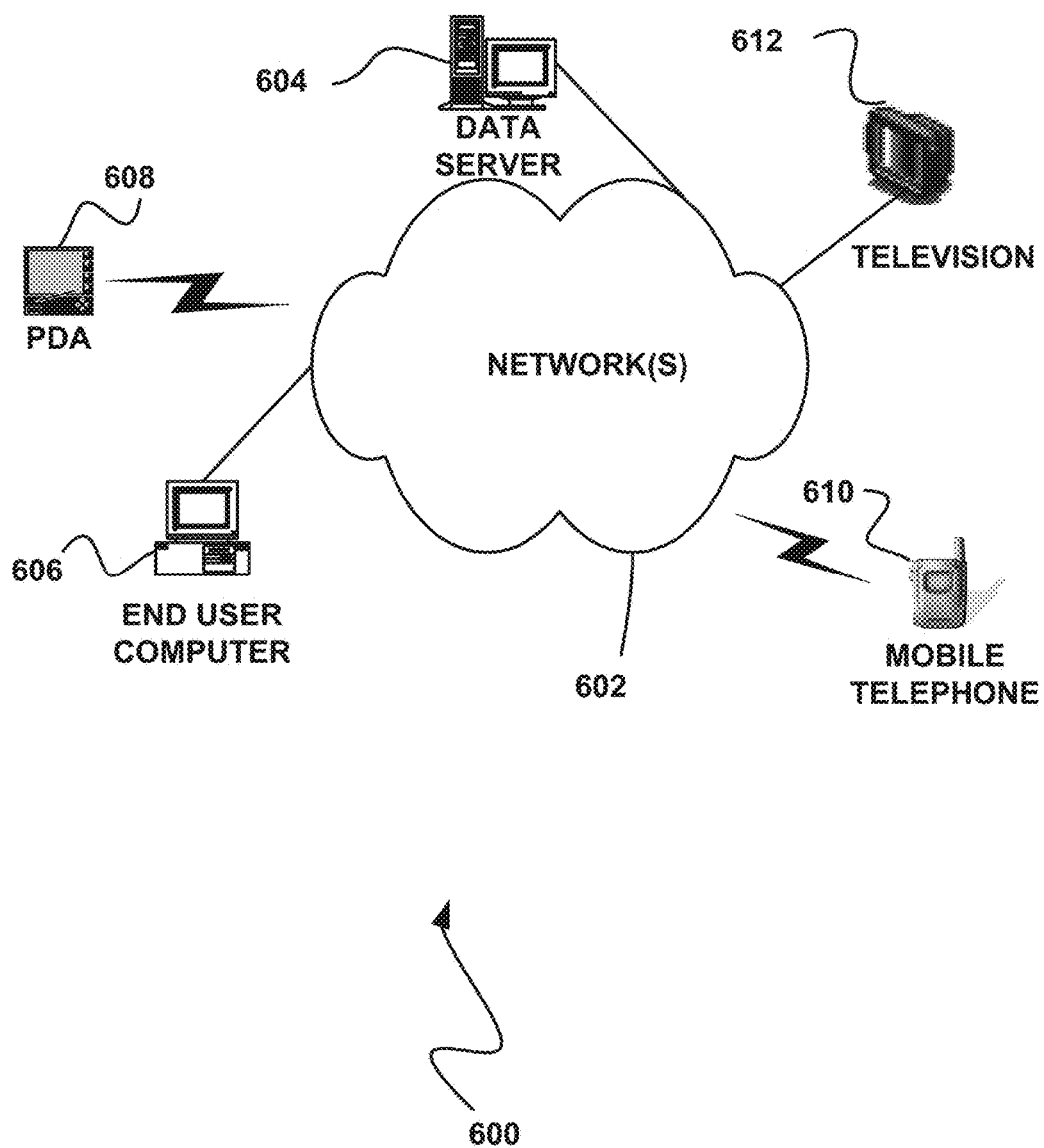
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
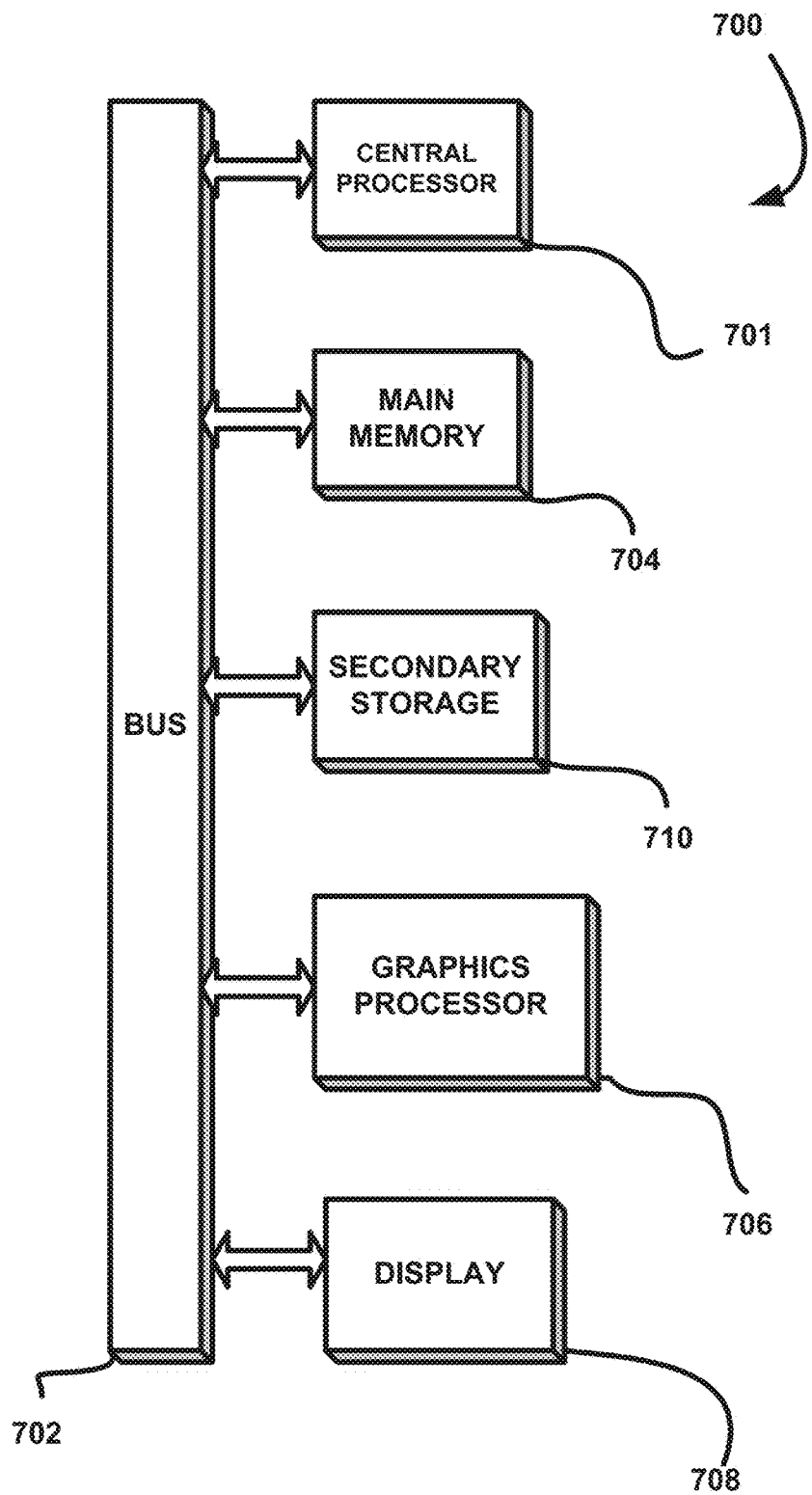
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
    collecting, by a computer system, subscriber measurement reports relating to usage of a network associated with a communication service provider (CSP) by subscribers to the network, the subscriber measurement reports each indicating for a different subscriber:
        bandwidth usage of the network by the subscriber, and
        quality of experience of the subscriber with the network;
    for each of the subscriber measurement reports, geo-locating, by the computer system, the subscriber measurement report including tagging the subscriber measurement report with a geographical position estimate associated with the usage of the network;
    aggregating, by the computer system, the geo-located subscriber measurement reports according to predefined geographical areas within the network;
    performing, by the computer system, pattern recognition and trend analysis on the aggregated subscriber measurement reports to predict future network usage for each of the geographical areas within the network, the future network usage indicating:
        bandwidth usage of the network within the geographical area, and
        quality of experience of subscribers with the network within the geographical area;
    based on the future network usage predicted for each of the geographical areas within the network, identifying, by the computer system, one or more of the geographical areas within the network to modify for enhancing bandwidth and quality of experience within the one or more geographical areas within the network;

after modifying each of the one or more of the geographical areas within of the network to enhance bandwidth and quality of experience within the geographical area within the network, validating, by the computer system, growth associated with the geographical area within the network as a result of the bandwidth and quality of experience enhanced for the geographical area within the network.

2. The method of claim 1, wherein the network includes a radio access network (RAN).

3. The method of claim 1, wherein the network includes a broadband network.

4. A computer program product embodied on a non-transitory computer readable medium, comprising:

computer code for collecting, by a computer system, subscriber measurement reports relating to usage of a network associated with a communication service provider (CSP) by subscribers to the network, the subscriber measurement reports each indicating for a different subscriber:
bandwidth usage of the network by the subscriber, and
quality of experience of the subscriber with the network;

for each of the subscriber measurement reports, computer code for geo-locating, by the computer system, the subscriber measurement report including tagging the subscriber measurement report with a geographical position estimate associated with the usage of the network;

computer code for aggregating, by the computer system, the geo-located subscriber measurement reports according to predefined geographical areas within the network;

computer code for performing, by the computer system, pattern recognition and trend analysis on the aggregated subscriber measurement reports to predict future network usage for each of the geographical areas within the network, the future network usage indicating:
bandwidth usage of the network within the geographical area, and
quality of experience of subscribers with the network within the geographical area;

based on the future network usage predicted for each of the geographical areas within the network, computer code for identifying, by the computer system, one or more of the geographical areas within the network to modify for enhancing bandwidth and quality of experience within the one or more geographical areas within the network;

after modifying each of the one or more of the geographical areas within of the network to enhance bandwidth and quality of experience within the geographical area within the network, computer code for validating, by the computer system, growth associated with the geographical area within the network as a result of the bandwidth and quality of experience enhanced for the geographical area within the network.

5. A system comprising:
a memory system; and
one or more processing cores coupled to the memory system and that are each configured to:
collect subscriber measurement reports relating to usage of a network associated with a communication service provider (CSP) by subscribers to the network, the subscriber measurement reports each indicating for a different subscriber:
bandwidth usage of the network by the subscriber, and
quality of experience of the subscriber with the network;

for each of the subscriber measurement reports, geo-locate the subscriber measurement report including tagging the subscriber measurement report with a geographical position estimate associated with the usage of the network;

aggregate the geo-located subscriber measurement reports according to predefined geographical areas within the network;

perform pattern recognition and trend analysis on the aggregated subscriber measurement reports to predict future network usage for each of the geographical areas within the network, the future network usage indicating:
bandwidth usage of the network within the geographical area, and
quality of experience of subscribers with the network within the geographical area;

based on the future network usage predicted for each of the geographical areas within the network, identify one or more of the geographical areas within the network to modify for enhancing bandwidth and quality of experience within the one or more geographical areas within the network;

after modifying each of the one or more of the geographical areas within of the network to enhance bandwidth and quality of experience within the geographical area within the network, validate growth associated with the geographical area within the network as a result of the bandwidth and quality of experience enhanced for the geographical area within the network.

* * * * *